US005653313A

United States Patent [19]
Somerfield et al.

[11] Patent Number: 5,653,313
[45] Date of Patent: Aug. 5, 1997

[54] BRAKE BLOCKS

[75] Inventors: Alan Somerfield, London; Simon Roberts, Stockport, both of England

[73] Assignee: Madison Cycles PLC, Stanmore, England

[21] Appl. No.: 629,892

[22] Filed: Apr. 10, 1996

[30] Foreign Application Priority Data

Apr. 13, 1995 [GB] United Kingdom ............... 9507723

[51] Int. Cl.$^6$ ............................................. B60T 17/22
[52] U.S. Cl. ............................. 188/1.11 W; 188/73.1; 188/24.11
[58] Field of Search ................ 188/1.11 R, 1.11 E, 188/1.11 W, 1.11 WE, 73.1, 250 B, 250 G, 24.11, 24.12, 24.19, 24.22; 116/208; 192/30 W; 340/454

[56] References Cited

U.S. PATENT DOCUMENTS

| | | | |
|---|---|---|---|
| 3,213,971 | 10/1965 | Moyer et al. | 188/1.11 W |
| 3,385,256 | 5/1968 | Forbush | 116/208 |
| 3,556,046 | 1/1971 | Dombeck | 188/1.11 W |
| 3,592,295 | 7/1971 | Kennel | 188/1.11 W |
| 3,604,865 | 9/1971 | Bricker | 188/1.11 WE |
| 3,660,815 | 5/1972 | Rees | 188/1.11 WE |
| 3,675,197 | 7/1972 | Bennett et al. | 188/1.11 WE |
| 3,689,880 | 9/1972 | McKee et al. | 188/1.11 WE |
| 3,768,598 | 10/1973 | Pollinger et al. | 188/1.11 W |
| 3,906,443 | 9/1975 | Musselman | 188/24.22 |
| 3,943,486 | 3/1976 | Hayashida et al. | 188/1.11 WE |
| 4,005,766 | 2/1977 | Kennel | 188/1.11 W |
| 4,274,511 | 6/1981 | Moriya | 188/1.11 WE |
| 4,508,196 | 4/1985 | Jamon | 188/1.11 WE |
| 4,606,434 | 8/1986 | Vasilow et al. | 188/1.11 WE |
| 4,658,936 | 4/1987 | Moseley | 188/1.11 |
| 4,800,991 | 1/1989 | Miller | 188/1.11 |
| 4,842,102 | 6/1989 | Tateyama et al. | 188/24.21 |
| 5,168,962 | 12/1992 | Yoshigai | 188/24.19 |

FOREIGN PATENT DOCUMENTS

| | | | |
|---|---|---|---|
| 2450023 | 4/1976 | Germany | 116/208 |
| 2543474 | 4/1977 | Germany | 188/1.11 W |
| 0268035 | 5/1989 | Germany | 188/1.11 |
| 4240494 | 6/1996 | Germany | 188/1.11 W |
| 1530936 | 11/1978 | United Kingdom . | |

Primary Examiner—Douglas C. Butler
Attorney, Agent, or Firm—Rankin, Hill, Lewis & Clark

[57] ABSTRACT

A brake block comprises a brake pad (1), a support body (2) and indicator device (4) for indicating when the brake pad (1) is worn down to a predetermined level (7), the indicator being visible on the support body (2) and being triggered from a first to a second state when the pad is worn to the predetermined level (7). The second state is more visible than the first state and provides a brake wear indicator which is not readily overlooked. The visible indicator is normally recessed within the confines of the brake block's backing plate or lining support so as to be substantially concealed but is spring-biased out of the concealed state by triggering structure to be visible to indicate brake wear.

6 Claims, 2 Drawing Sheets

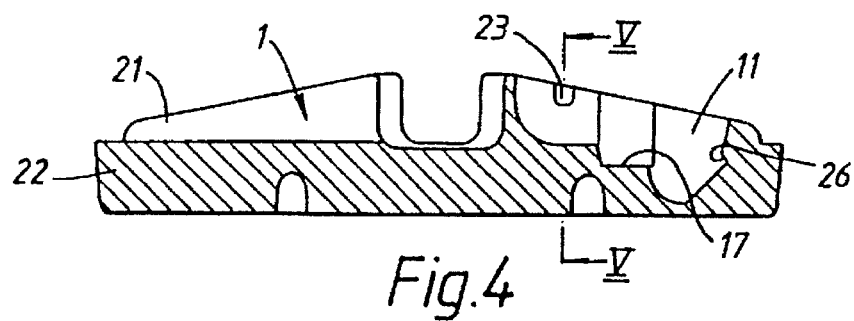
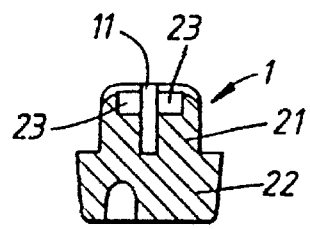
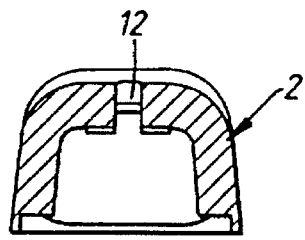
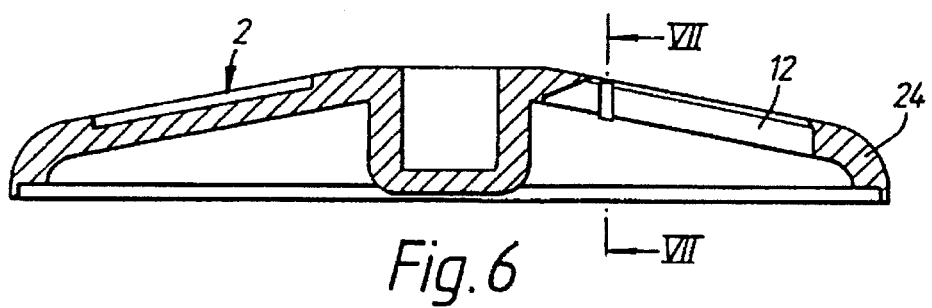
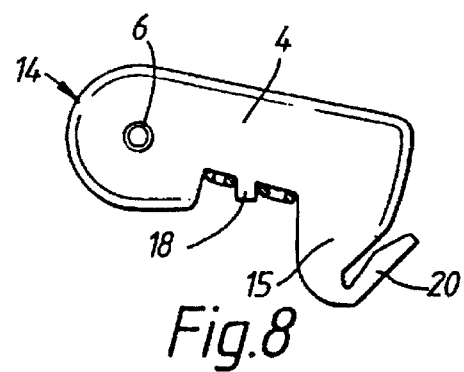

BRAKE BLOCKS

This invention relates to bicycle brake blocks.

In existing bicycle brake blocks, extensive wear of the brake pad is only revealed by a close inspection of the pad itself. It has been known to provide a groove or mark on the side of the brake pad at a selected position which indicates that when the pad is worn down close to the mark or groove the brake pad should be replaced. It is, however, easy to overlook such a brake wear indicator and to fail to realise that the brake pad needs replacing. Clearly, a potentially dangerous situation may then arise, where the bicycle user only realises that a brake pad requires replacing when the brake fails.

According to the present invention there is provided a bicycle brake block comprising a brake pad, a support body and means for visually indicating when the brake pad is worn down to a predetermined level, said indicating means being visible on the support body and being triggered from a first to a second state when the pad is worn to said level.

The brake block preferably comprises triggering means fitted in or on the brake pad at said predetermined level and adapted to trigger said indicating means when the pad has worn to said level.

In a preferred embodiment, an aperture is provided in the brake pad and the triggering means is supported in the aperture. The indicating means preferably comprises a movable tab wherein, in said first state, the tab is recessed within the support body and, in said second state, the tab protrudes from said support body to provide a brake wear indicator. The triggering means may then comprise a lug adapted to engage against a shoulder in said aperture at the predetermined level and a biasing means for biasing the indicating means in a direction away from the support body. Thus, as the brake pad wears down, the lug also wears down until, at the predetermined level, the lug has been worn away such that it no longer engages against the shoulder. The biasing means is then free to move indicating means to the second state where it protrudes from said support body.

The indicating means and the lug may be connected together or may be integral with each other.

The indicating means is preferably pivotably connected to said support body or said brake pad, but may be integral with said support body.

The biassing means preferably comprises a mechanical spring and in a particularly preferred embodiment comprises a helical spring. The biassing means may be integral with the indicating means.

In an alternative embodiment of the invention, the indicating means comprises a light source which is switched off in said first state and switched on in said second state. The light source may, for example, be a light emitting diode.

Preferably, the brake block of the present invention is adapted to be fitted to standard bicycles.

To preferred embodiments of the brake block of the present invention will now be described in more detail, by way of example only, with reference to the accompanying drawings in which:

FIG. 4 is a sectional view of a brake pad for use in a second embodiment of brake block in accordance with the present invention;

FIG. 5 is a sectional view taken on line V—V in FIG. 4;

FIG. 6 is a sectional view of a support body for use in the second embodiment of brake block;

FIG. 7 is a sectional view taken on line VII—VII in FIG. 6; and

FIG. 8 is a side view of an indicating means for use in the second embodiment of brake block.

Figure 1:
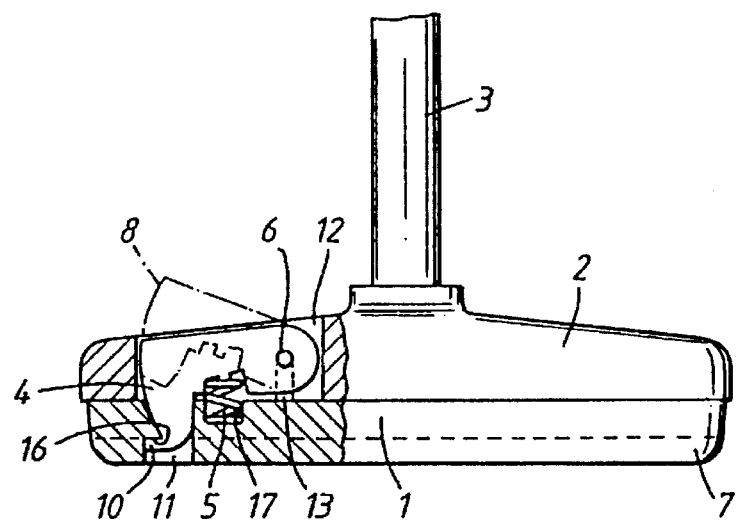
FIG. 1 is a part-sectional view of an embodiment of brake block in accordance with the present invention.
Figure 3:
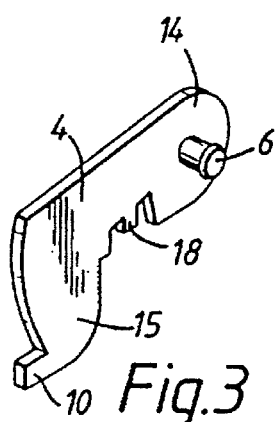
FIG. 3 is a perspective view of the indicating means shown in the brake block of FIG. 1.
Figure 2:
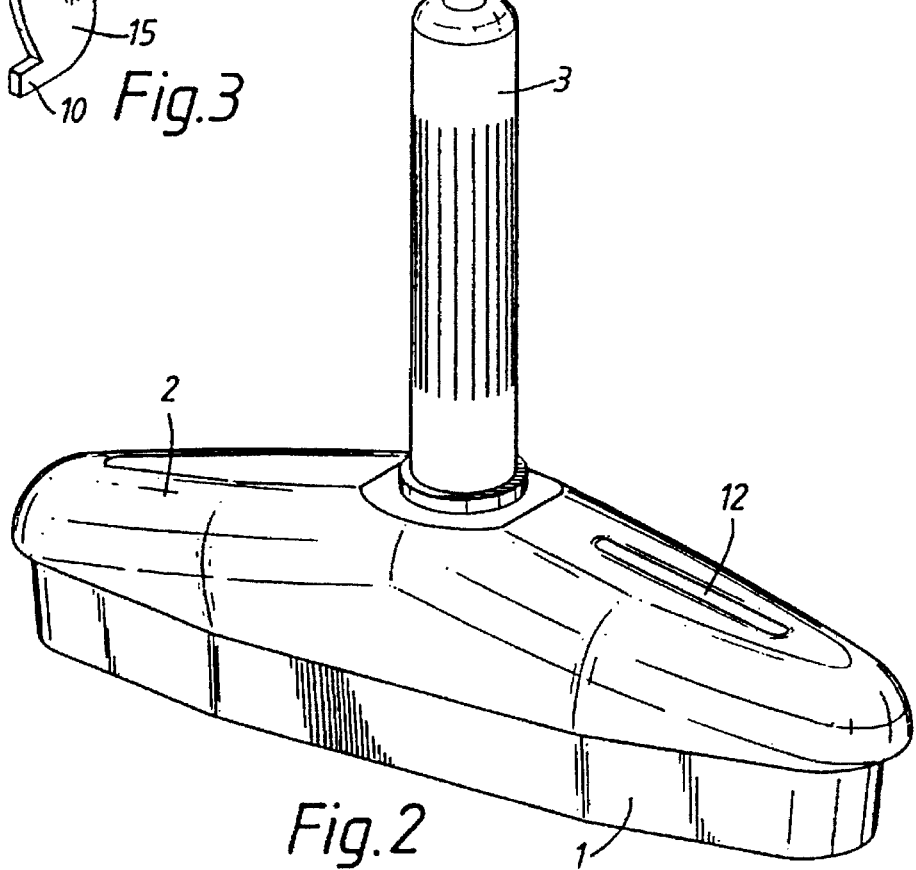
FIG. 2 is a perspective view of the brake block of FIG. 1.

Referring to FIGS. 1 to 3 of the drawings, a first embodiment of the brake block comprises a brake pad 1 and a support body 2 to which the brake pad is connected in any suitable manner, as is already well known in the art. A stud 3 is fitted to the support body in any conventional way.

An aperture 11 is formed in the brake pad 1. The aperture 11 may pass all the way through the pad as shown or may have a closed outer end providing a continuous operative brake pad surface when the pad is new.

The support body 2 is also provided with an aperture or slot 12, the apertures 11 and 12 being positioned one above the other when the pad and support body are connected together. Recesses 13 are formed in each side wall of the slot 12.

A brake wear indicator tab 4 is positioned within the apertures 11 and 12 when the brake pad is new, pivot pins 6 being provided on either side of the tab 4 and fitting into recesses 13 in the slot 12. The brake wear indicator tab 4 is generally L-shaped in configuration, the pivot pins 6 being provided at or near one free end 14 of the L-shaped tab, the other free end 15 having a hook or lug 10.

Within aperture 11 there is a shoulder 16 formed at a predetermined level 7 (indicated by the dotted line) within the brake pad, the predetermined level being that at which the brake wear indicator should be triggered to indicate to a user that the pad should be replaced.

When the brake block is newly assembled, the pivot pins 6 are held in recesses 13 and the tab 4 is thus pivotably connected to the brake block. Lug 10 engages under shoulder 16 to hold the lug in the position shown in FIG. 2 and shown in solid outline in FIG. 1.

A spring 5, which may be a helical spring as shown or any other suitable biassing spring, is fitted between the tab 4 and the inner surface of the brake pad 1. The spring 5 is located at one end in a recess 17 in the inner surface of the brake pad and at the other end over a locating pin 18 formed on the tab 4. The spring 5 is under compression and biasses the tab 4 in the direction away from the support body 2.

During use the brake pad 1 is gradually worn down. As it wears, the lug 10 is also exposed to wear and is worn down. Accordingly, when the pad 1 is worn down to the predetermined level 7, the lug 10 will also have been worn away and will no longer hold the tab 4 recessed in the brake block against the force of spring 5. Thus the tab 4 will be moved by the force of the spring 5 away from the support body and into the position shown by dotted outline 8 in FIG. 1.

Once in the position shown by the dotted outline 8, the tab 4 is an immediately visible brake wear indicator on the support body 2, such that close inspection of the pad 1 will no longer be necessary to ascertain whether the pad needs replacing. The tab may, for example, be brightly coloured in order to be more visible.

Clearly, the tab 4 may be of any appropriate shape, such as a button or a square. The tab could also be made integral with the support body and/or the spring may be integrally formed with the tab.

The second embodiment of the invention shown in FIGS. 4 to 8 is substantially similar to the first embodiment and like numerals will be used for like parts.

The brake pad 1 shown in FIGS. 4 and 5 differs from that shown in FIGS. 1 and 2 in that the brake pad is provided with an upper portion 21 and a lower portion 22. The support body 2 shown in FIGS. 6 and 7 comprises a hollow housing 24 and the upper portion 21 of the brake pad 1 fits cooperatingly into the hollow housing 24 of the support body 2. The aperture 11 in the brake pad, which receives the indicator tab 4, is provided with recesses 23 in either side wall of aperture 11. The pivot pins 6 on tab 4 fit into recesses 23 in the aperture 11.

Tab 4 shown in FIG. 8 has a hook 20 at free end 15, the hook 20 being angled upwardly towards the support body when the tab 4 is fitted in the brake block of the second embodiment. Hook 20 then engages under angled shoulder 26 within aperture 11 in the brake pad.

The detailed embodiments of the invention described above are not intended to restrict the scope of this invention which is defined in the appended claims.

What is claimed is:

1. A bicycle brake block, comprising:

a support body having first and second major surfaces and defining an aperture in the second major surface;

a brake pad attached to the first major surface of the support body and having a recess therein facing the first major surface;

a visual indicator in the form of a movable member, the member being mounted in the aperture in the support body and having a portion located in the recess in the brake pad;

a spring for biasing the visual indicating means in a direction away from the support body; and triggering means associated with the brake pad at a predetermined level of the pad, said triggering means being arranged to allow said biasing means to cause the movable member forming the visual indicating means to move from a first state wherein the member is recessed in the aperture in the support body and a second state wherein at least a portion of the member protrudes from said second major surface of the support body to provide a brake wear indication when the pad has worn to said predetermined level.

2. A brake block in accordance with claim 1, wherein the triggering means comprises a lug adapted to engage against a shoulder in said aperture and a biassing means for biassing the indicating means in a direction away from the support body.

3. A brake block in accordance with claim 2, wherein the indicating means and the lug are integral with each other.

4. A brake block in accordance with claim 2, wherein the biassing means comprises a mechanical spring.

5. A brake block in accordance with claim 4, wherein the biassing means comprises a helical spring.

6. A brake block in accordance with claim 1, wherein the indicating means is pivotably connected to said brake block.

* * * * *